H. PARSONS.
Loom-Heddle Frame.
No. 6,466. Reissued June 1, 1875.
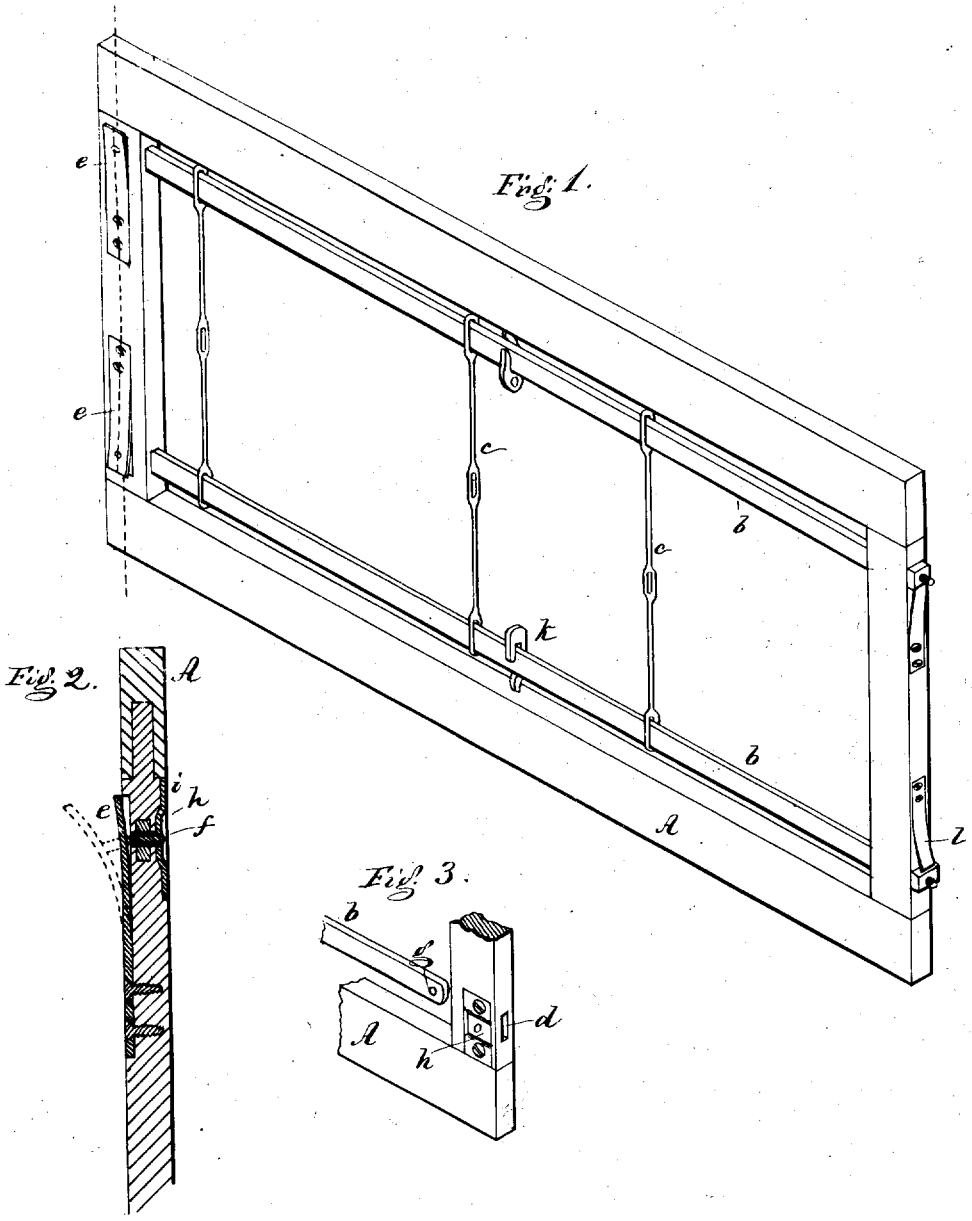
Witnesses.
L. H. Latimer.
Wm. Pratt.
Inventor.
George Crompton
Assignee of Henry Parsons
PER Lemby & Gregory Attys.

UNITED STATES PATENT OFFICE.

HENRY PARSONS, OF WATERLOO, NEW YORK, ASSIGNOR TO GEORGE CROMPTON, OF WORCESTER, MASSACHUSETTS.

IMPROVEMENT IN LOOM HEDDLE-FRAMES.

Specification forming part of Letters Patent No. 36,166, dated August 12, 1862; reissue No. 6,466, dated June 1, 1875; application filed April 28, 1875.

*To all whom it may concern:*

Be it known that HENRY PARSONS, of Waterloo, in the county of Seneca and State of New York, invented an Improvement in Heddle-Frames for Looms, of which the following is a specification:

The object of this invention is to secure the heddle-bars in their frames in such manner as to be easily removable, and when in place in the frames the bars are firmly and positively retained.

Prior to this invention the bars in heddle-frames have been confined in the following different ways: The first and most common method is to drive metallic pins through the sides of the frame and through openings in the ends of the heddle-bars, leaving the ends flush with the sides of the frame, but these pins soon become loose, work out laterally and interfere with the vertical movements of adjacent frames, and when badly worn drop out, resulting in much difficulty. To prevent their working loose quickly, they have been driven in tightly, and this makes it quite difficult to remove a heddle-bar for change of heddles, as the pins have to be driven out and the hole is enlarged or the pin injured. To prevent the pins working out they have been headed or riveted down, making it necessary to cut off the heads of the rivets before removing the bars; and the heddle-rods have also had nuts applied at each end, as in United States Patent No. 544, but these nuts are liable to work loose.

This invention consists in a heddle-bar-holding attachment, secured to the heddle-frame and provided with a movable pin to be projected into or withdrawn from the opening in, when it is desired to retain or remove, a heddle-bar, and by this invention the bars of heddle-frames, on which the heddles are strung, may be quickly and easily removed or inserted for the introduction, removal, or repair of heddles, and there are no pins or nuts to get loose or interfere with adjacent heddle-frames, and the frames can therefore be run closely together and without liability of being caught, the one on the other, or of the harness-cords being strained.

Figure 1 is a perspective view of the invention, looking on the rear side of the heddle-frame. Fig. 2 is a section on the dotted line, Fig. 1, and Fig. 3 is a detail of one corner of the frame with the end of the heddle-bar drawn out.

The gist of this invention consists in a heddle-bar-holding device consisting of an arm and a pin, the arm being connected with the heddle-frame, and the pin being adapted by movement of the arm to be passed into or withdrawn from the opening in the heddle-bar, this pin serving, in connection with the frame with which it works, to hold the bar from longitudinal movement.

A represents an ordinary rectangular heddle-frame, in which are mounted the heddle-bars *b b*, having strung thereon heddles *c*, of well-known construction, as indicated. The ends of the heddle-bars rest in mortises *d d*, made in the side or end pieces of the frame, and are secured in place substantially as hereinafter described. On one of the side or end pieces of the frame are situated heddle-bar holding devices, consisting as herein shown, of arms *e*, and pins *f*, connected to or sunk flush with the wood of the frame. One end of arm *e* is movable with relation to the frame and its pin *f*, is adapted to be projected within or withdrawn from the opening in the end of the heddle-bar, after the latter is placed in the mortise made in the frame to receive it. The pin *f*, as shown, passes through a hole *g*, in the extremity of the heddle-bar, and confines the same to the wood-work by passing through a corresponding hole in the wood-work, and at the point where the pin *f* passes through to the opposite side of the frame is made a depression *h*, either in the wood or in a metallic piece, *i*, inserted therein and of sufficient size to admit the finger of the operator, and of such depth as will allow the end of the pin to be pressed back so far that the arm *e* may be turned back, as shown in dotted lines, Fig. 2, to allow the pin *f* to be withdrawn from the hole *g* in the bar *b*. This arrangement for holding the ends of the heddle-bars is very simple and efficient. The force of the arm *e*, which is shown as a spring, always keeps the pin *f* and the bar in place during the most violent motion of the harness, and the parts do not project from the frame to interfere with an adjacent heddle or harness frame, and they can work in contact with each other without interference; and the heddle-bars are expeditiously removed by merely withdrawing the pin *f*. The opposite ends of the heddle-bars rest likewise in the opposite side or end piece of the frame, and have cut on their extremities, outside the frame, screw-threads, on which are placed square nuts *h h*, as represented in Fig. 1, and by means of these nuts the heddle-bars are straightened or tightened so that they will not rattle or spring. During the operation of the harness-frames these nuts are liable to work loose and be lost provided they are not held in place, and the work is thereby disarranged. To securely retain these nuts, springs *l*, with square ends and substantially of the form represented, are attached to the end-piece of the frame, the springs springing outward sufficiently to bring the square ends respectively against one side of the nuts, and thereby preventing the nuts from turning, but when the nuts are to be turned the springs are sprung outward or pressed in, away from the sides of the nuts. The heddle-bars may be stiffened or braced centrally by hooks or supports *k k*, or in any desirable manner.

What is claimed is—

The combination, with the heddle-frame, of a heddle-bar holding-device, consisting of an arm and a pin adapted to be connected with the upright side or end piece of the heddle-frame, whereby the heddle-bar may be engaged or disengaged by the movement of the pin and its carrying-arm, substantially as and for the purpose described.

GEO. CROMPTON,
*Assignee of Henry Parsons.*

Witnesses:
J. A. WARE,
J. B. SYME.